(12) United States Patent
Coudurier et al.

(10) Patent No.: US 8,016,122 B2
(45) Date of Patent: Sep. 13, 2011

(54) POT OR PAN LID WITH A DRAINING FUNCTION AND A LARGE AREA VIEW

(75) Inventors: Oliver Coudurier, Pringy (FR); Ludovic Pasquini, Annecy (FR)

(73) Assignee: SEB S.A., Ecully (FR)

( * ) Notice: Subject to any disclaimer, the term of this patent is extended or adjusted under 35 U.S.C. 154(b) by 423 days.

(21) Appl. No.: 12/139,210

(22) Filed: Jun. 13, 2008

(65) Prior Publication Data

US 2008/0308489 A1    Dec. 18, 2008

(30) Foreign Application Priority Data

Jun. 15, 2007   (FR) ...................... 07 04266

(51) Int. Cl.
*B01D 24/38*   (2006.01)
*A47J 27/00*   (2006.01)

(52) U.S. Cl. ...................... 210/469; 220/573.1; 210/464

(58) Field of Classification Search ................... 210/469, 210/464; 220/573.1
See application file for complete search history.

(56) References Cited

U.S. PATENT DOCUMENTS

| | | | | |
|---|---|---|---|---|
| 1,328,558 A | * | 1/1920 | Brooks .......................... | 210/469 |
| 4,487,117 A | * | 12/1984 | Colley et al. .................... | 99/341 |
| 6,789,683 B1 | * | 9/2004 | Fisher ........................... | 210/465 |

FOREIGN PATENT DOCUMENTS

| | | | |
|---|---|---|---|
| DE | 29510342 U1 | | 9/1995 |
| FR | 2473868 A | | 7/1981 |
| GB | 2302263 A | * | 1/1997 |
| WO | 2007052984 A1 | | 5/2007 |

* cited by examiner

*Primary Examiner* — Nam X Nguyen
*Assistant Examiner* — Denise R Anderson
(74) *Attorney, Agent, or Firm* — Browdy and Neimark, PLLC

(57) ABSTRACT

A culinary vessel lid in the form of a cover that is adapted for covering the vessel and that includes a transparent covering part, a metal covering part provided with through openings intended for draining foods and a silicone retaining ring.

10 Claims, 2 Drawing Sheets

POT OR PAN LID WITH A DRAINING FUNCTION AND A LARGE AREA VIEW

BACKGROUND OF THE INVENTION

The present invention relates to a lid for a culinary vessel, for example a pot, pan, baking dish, casserole, etc.

French Patent Application FR 0602537 discloses a lid for a culinary vessel, of the type including a glass cover adapted for covering the culinary vessel and a silicone retaining ring surrounding the cover and including a sloping, or descending, wall provided with openings that cooperate with a pouring lip in the side wall of the culinary vessel for draining foods. The retaining ring also includes radial extensions acting as grasping elements.

This type of lid has the disadvantage that it does not drain well. In fact, the openings in the descending wall of the lid, facing the pouring lip, are few in number, which limits the amount of water that can be drained from the culinary vessel. Moreover, these openings in a silicone wall are hard to clean.

BRIEF SUMMARY OF THE INVENTION

The present invention provides an improved lid for a culinary vessel that offers a clear view of a large area portion of the food being cooked in the culinary vessel, and that also provides excellent drainage.

The lid for a culinary vessel according to the invention is also simple in design and economical to manufacture.

A pot or pan lid according to the invention comprises a cover that is adapted for covering the pot or pan and that includes a transparent covering part, the lid also comprising a silicone retaining ring surrounding the cover, by the fact that the cover includes a metal covering part provided with through openings intended for draining foods.

Thus, according to the invention, the cover constituting the lid is in two parts: a transparent part to allow a clear, wide area view into the culinary vessel, and a perforated metal part to make it easy to drain cooked foods.

Advantageously, the transparent covering part and the metal covering part are held by a connecting element produced by overmolding the connecting element over the transparent part and the metal part.

This arrangement makes it possible to make a connecting element simply and economically. Moreover, the technique of overmolding allows the production of connecting element shapes that make it possible to optimize the surface areas of the viewing and draining parts.

The retaining ring is preferably produced by overmolding plastic material over and around the outer edges of the transparent part and the metal part.

This arrangement makes it possible to manufacture a lid very economically by producing the retaining ring and the connecting element in a single operation, preferably by overmolding.

Advantageously, the metal covering part includes extensions that extend radially beyond the periphery of the retaining ring.

This arrangement makes it possible, simply and economically, to obtain two side handles for the lid.

Preferably, the extensions of the metal covering part are covered with silicone in the overmolding operation to form the handles.

This arrangement makes it possible to thermally insulate the handles and to make the handles safer to touch.

Advantageously, the ring has a lower face providing means for centering the lid on the culinary vessel.

This arrangement makes it possible, economically, to position the lid on the culinary vessel, because the centering means are made at the same time as the retaining ring, in the overmolding operation.

Preferably, the ratio between the surface area of the transparent covering part and the total surface area of the cover is between 0.5 and 0.8, and preferably is 0.6.

This arrangement provides a lid with an essentially transparent cover, making it possible to see into the culinary vessel more easily.

BRIEF DESCRIPTION OF THE DRAWINGS

The invention will be better understood from the entirely non-limiting embodiments shown in the accompanying drawings, in which.

DETAILED DESCRIPTION OF THE INVENTION

Figure 1:
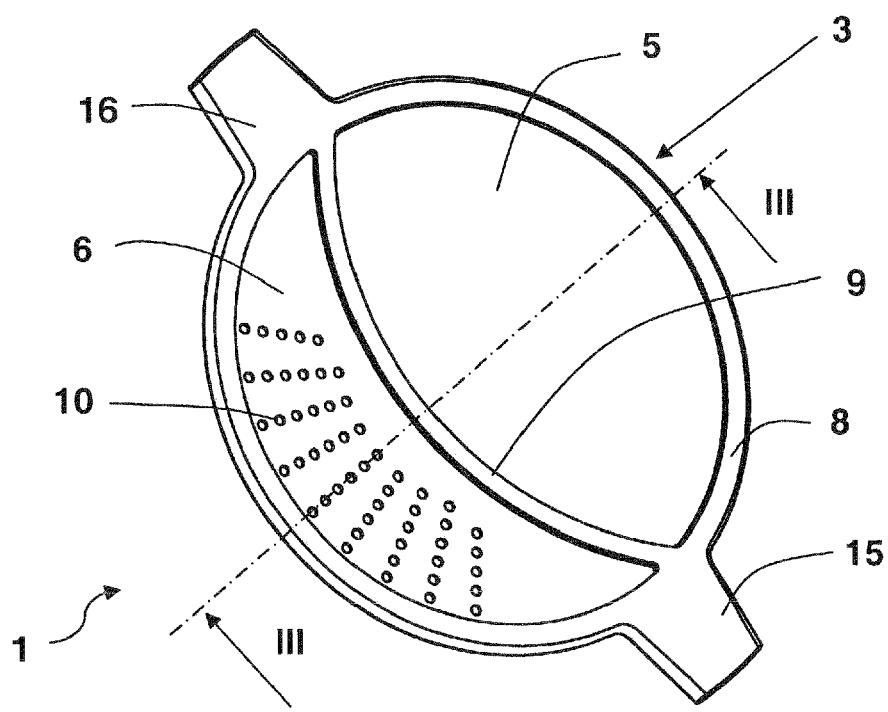
FIG. 1 is a perspective view from above of a lid of a culinary vessel, according to a particular embodiment of the invention.

As can be seen in FIGS. 1 through 4, a lid 1 according to the invention for a culinary vessel is constituted by a cover 3 adapted for covering the culinary vessel and having as a first part a transparent covering part 5, such as a glass plate, that allows one to see into the culinary vessel. Lid 1 also includes a silicone retaining ring 8 surrounding cover 3 and enclosing, and extending radially past, the periphery of cover 3.

According to the present invention, cover 3 includes as its second part a metal covering part 6, provided with through openings 10 adapted to allow the escape of steam and the draining of liquid from foods cooked in the culinary vessel. Metal covering part 6 is preferably of stainless steel.

Figure 3:
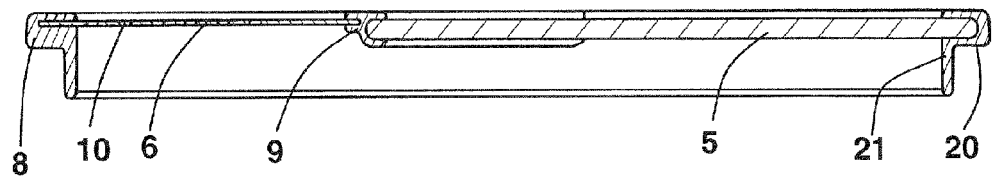
FIG. 3 is a partial cross-sectional view along the line III-III of the lid of the culinary vessel of FIG. 1.
Figure 4:
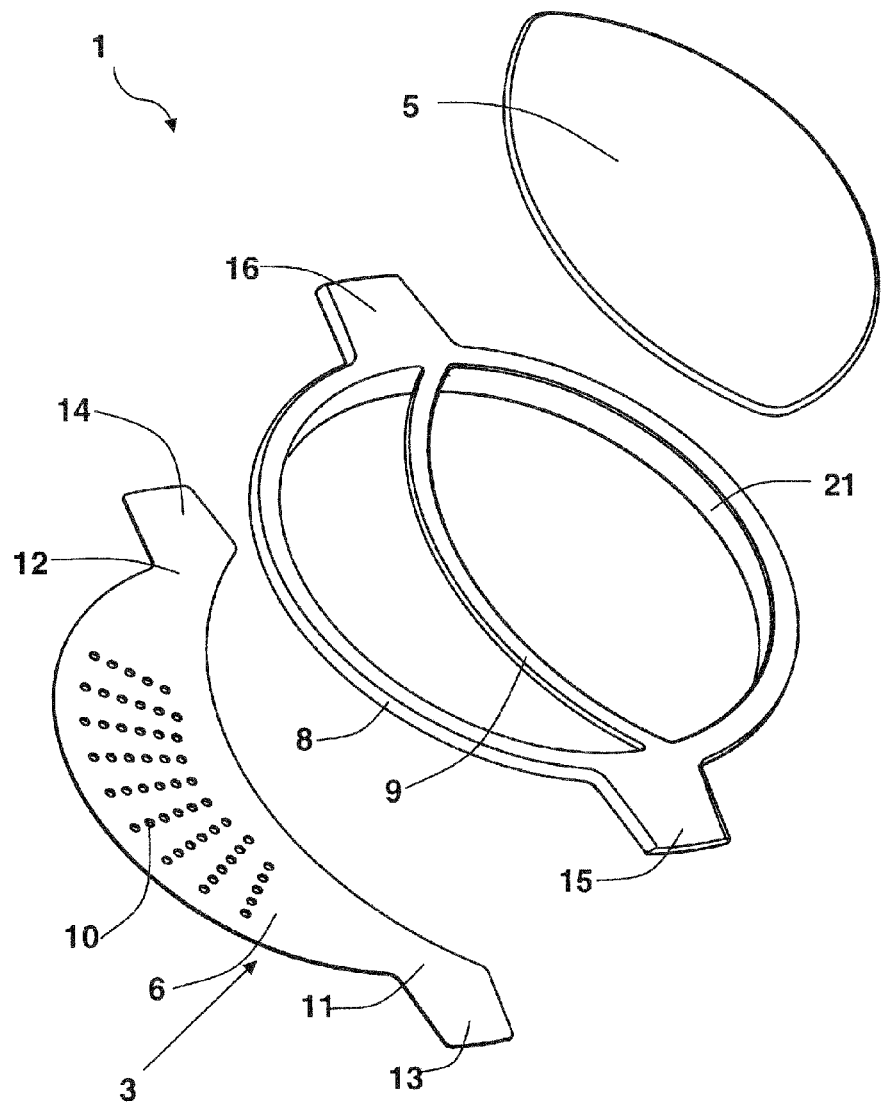
FIG. 4 is an exploded perspective view of the lid of the culinary vessel of FIG. 1.

Transparent covering part 5 and metal covering part 6 are held together in part by a connecting element 9 made by overmolding, this connecting element 9 having a cross section in the general shape of an H (FIG. 3). Advantageously, retaining ring 8 is made in the same overmolding operation and forms an integral, or one-piece, body with connecting element 9.

In the disclosed embodiment, cover 3 has a circular shape, and metal covering part 6 has a crescent shape (FIG. 4) that includes two ends 11, 12. These two ends 11, 12 each include a respective extension 13, 14 extending radially past the periphery of retaining ring 8. The two extensions 13, 14 are arranged to be diametrically opposite one another toward the outside of cover 3.

The two extensions 13, 14 can be covered with silicone in the overmolding operation, to form two handles 15, 16 for the lid 1.

Figure 2:
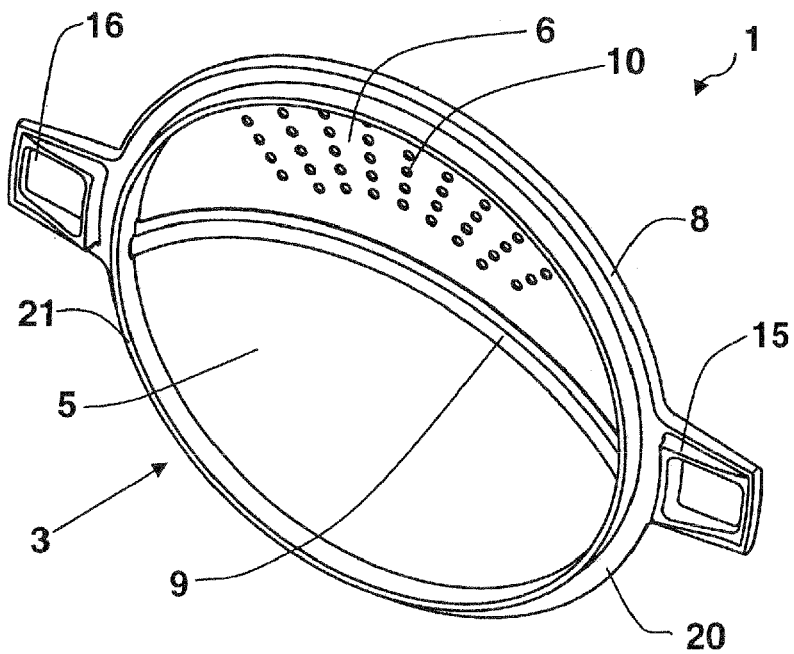
FIG. 2 is a perspective view from below of the lid of the culinary vessel in FIG. 1.

Retaining ring 8 has a lower face 20 provided with means 21 for centering lid 1 on the culinary vessel (FIGS. 2 and 3). These centering means 21 are formed by a descending wall 21 produced at the same time as the retaining ring 8 and the connecting element 9 in the overmolding operation.

The majority of the surface area of cover 3 is occupied by transparent covering part 5 for the sake of a wide view into the culinary vessel. The ratio of the surface area of transparent covering part 5 to the total area of cover 3 is between 0.5 and 0.8 and is preferably 0.6.

This application relates to subject matter disclosed in French application No. 07 04266, filed Jun. 15, 2007, the disclosure of which is incorporated herein by reference.

It is understood that the invention is in no way limited to the embodiment described and shown, which is given solely by way of example. Modifications can still be made, specifically from the standpoint what constitutes the various elements or by substituting equivalent techniques, without departing from the scope of the invention.

The invention claimed is:

1. A lid for a culinary pot or pan comprising: a cover adapted to cover the culinary pot or pan and including a transparent covering part; a silicone retaining ring bordering said cover, wherein said cover further comprises a metal covering part provided with through openings in said lid, said openings being dimensioned for draining liquid from the culinary pot or pan, and a connecting element holding said transparent covering part and said metal covering part together, said connecting element is overmolded around edges of said transparent covering part and said metal covering part, and said retaining ring is overmolded around said transparent covering part and said metal covering part.

2. The lid as defined in claim 1, wherein said metal covering part includes extensions extending radially past the periphery of said retaining ring.

3. The lid as defined in claim 2, wherein said extensions of said metal covering part are covered with silicone that is overmolded on said extensions at the same time that said retaining ring is overmolded around said transparent covering part and said metal covering part.

4. The lid as defined in claim 2, wherein said extensions of said metal covering part are covered with silicone that is overmolded on said extensions.

5. The lid as defined in claim 1, wherein said retaining ring has a lower face comprising means for centering said lid on the culinary pot or pan.

6. The lid as defined in claim 5, wherein the ratio between the surface area of said transparent covering part and the total surface area of said cover is between 0.5 and 0.8.

7. The lid as defined in claim 6, wherein the ratio is 0.6.

8. The lid as defined in claim 1, wherein the ratio between the surface area of said transparent covering part and the total surface area of said cover is between 0.5 and 0.8.

9. The lid as defined in claim 8, wherein the ratio is 0.6.

10. The lid as defined in claim 1, wherein said lid consists of said cover, said connecting element and said silicone retaining ring.

* * * * *